No. 608,776. Patented Aug. 9, 1898.
G. S. HOFFMAN.
DRAFT EQUALIZER.
(Application filed May 28, 1897.)
(No Model.)
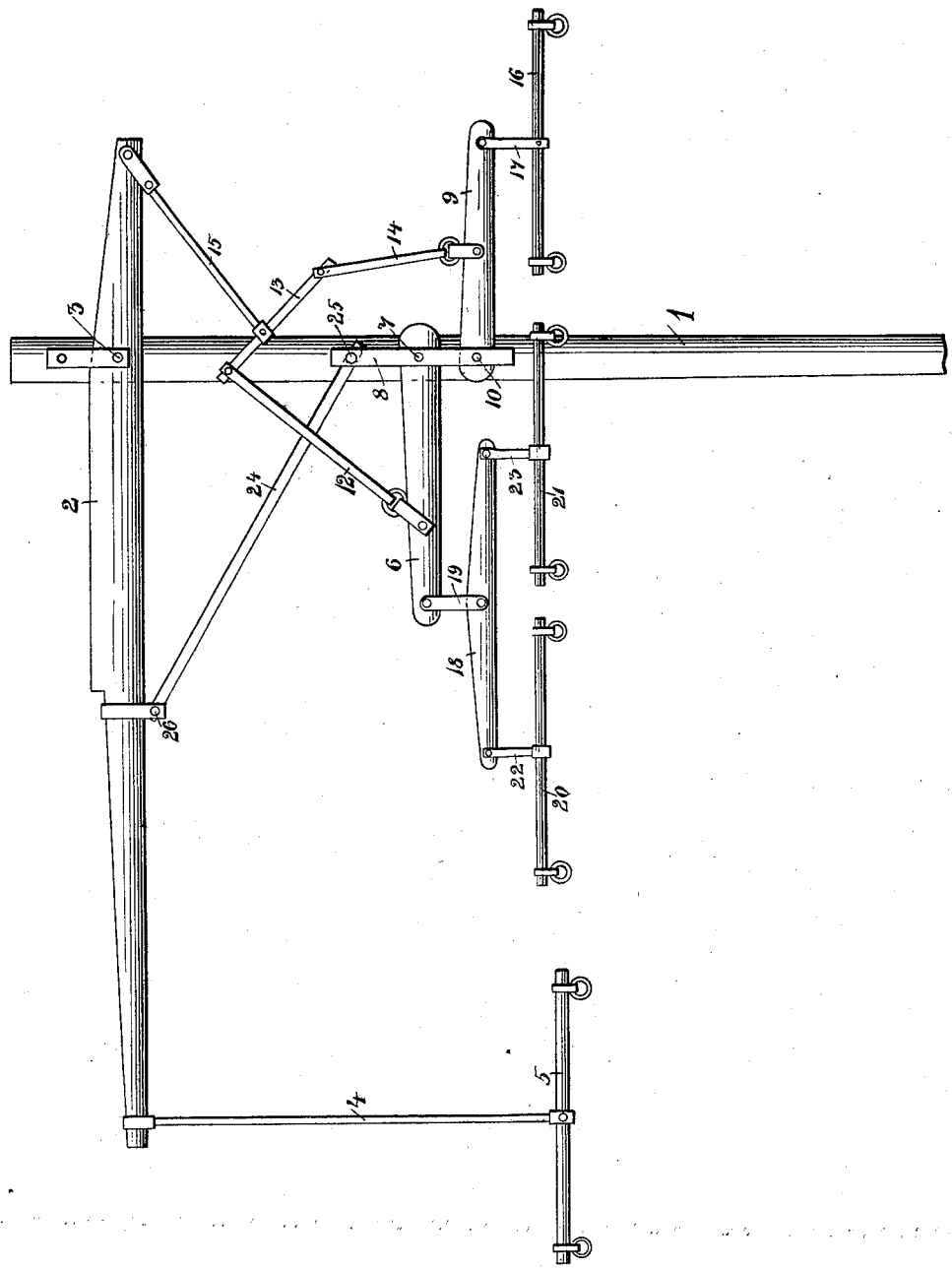
Witnesses
O. Seiffert
J. A. Wilson
Inventor
Godfrey S. Hoffman
by H. B. Wilson
Attorney

UNITED STATES PATENT OFFICE.

GODFREY S. HOFFMAN, OF MINNEAPOLIS, KANSAS.

DRAFT-EQUALIZER.

SPECIFICATION forming part of Letters Patent No. 608,776, dated August 9, 1898.

Application filed May 28, 1897. Serial No. 638,591. (No model.)

*To all whom it may concern:*

Be it known that I, GODFREY S. HOFFMAN, a citizen of the United States, residing at Minneapolis, in the county of Ottawa and State of Kansas, have invented certain new and useful Improvements in Draft-Equalizers; and I do declare the following to be a full, clear, and exact description of the invention, such as will enable others skilled in the art to which it appertains to make and use the same.

My invention relates to improvements in draft-equalizers for harvesters; and the object is to produce a simple, convenient, and reliable device of this class whereby two, three, or four horses may be employed abreast.

To this end the novelty consists in the construction, combination, and arrangement of the same, as will be hereinafter more fully described, and particularly pointed out in the claim.

The figure in the drawing is a plan view of my improved draft-equalizer as it appears with the parts assembled for four horses.

1 represents the pole, and 2 is the main lever, fulcrumed thereto on the bolt 3. The longer arm of said lever is provided with a rod 4, to which is pivoted a singletree 5.

6 represents a lever which is fulcrumed on the bolt 7, secured to the bar 8 about midway of its length, said bolt 7 being secured also to the pole 1. A rod 12 extends from the lever 6 to one end of the lever 13, and a similar rod 14 extends from the lever 9 to the opposite end of the lever 13. A connecting-rod 15 extends from the lever 13 to the outer end of the shorter arm of the main lever 2. The forward end of the rod 15 is provided with a suitable clamp, by means of which the forward end of the rod 15 is rendered adjustable on the lever 13. A singletree 16 is connected by a draft-rod 17 to the outer end of the lever 9.

18 represents a doubletree connected by a rod 19 to the outer end of the lever 6, and 20 21 represent singletrees connected to the outer ends of said doubletree by the draft-rods 22 23. A brace-rod 24 extends from the bolt 25, fixed in the pole, to a similar bolt 26 on the main lever 2. The result of this arrangement of levers and other described parts of the draft-equalizer is to bring the line of draft along the pole 1 and compel all of the horses to exert their power along this line of draft. Should the single horse forge ahead, he will draw the horses harnessed to the whiffletrees rearward, and the motion thus given to the evener-bar will be imparted through the levers and their connections to the whiffletrees, and the draft will be thus equalized, so that all of the horses will be made to perform the same amount of work.

Having thus fully described my invention, what I claim as new and useful, and desire to secure by Letters Patent of the United States, is—

In a draft-equalizer, the combination with the pole and a bar 8 pivoted near its center on said pole, of a main lever pivoted near one of its ends to said pole, a singletree 5 pivotally connected to the long end of said main lever, a set of singletrees and doubletrees carried by the pole and connected to the shorter end of the main lever and consisting of oppositely-projecting levers 9 and 6, the one of which is fulcrumed at its inner end in one end of said bar 8, and the other of which is fulcrumed at its inner end on the pivot of said bar 8, and the former of which is shorter than the latter, the lever 13 mounted on a movable fulcrum on the rod 15, pivoted to the shorter end of the main lever 2, a doubletree carrying singletrees connected to the free end of the longer of said levers and a singletree connected to the free end of the shorter of said levers, a rod connecting the long end of the main lever with the free end of the bar 8 and an intermediate means adapted to equalize the forces applied to the levers 9 and 6 and also completing the connection between the singletree 5 and the set of singletrees and doubletrees and consisting of a toggle-lever connected at each of its ends to one of said levers 9 and 18 between the ends thereof and connected between its ends to the shorter end of the main lever substantially as described.

In testimony whereof I hereunto affix my signature in presence of two witnesses.

GODFREY S. HOFFMAN.

Witnesses:
 A. D. SWAYZE,
 LEWIS A. HENRY.